US012025930B2

(12) United States Patent
Ikeda et al.

(10) Patent No.: US 12,025,930 B2
(45) Date of Patent: Jul. 2, 2024

(54) FIXING DEVICE INCLUDING A PRESSURE ROTATOR SETTING AN EXIT GUIDE ANGLE AND IMAGE FORMING APPARATUS INCORPORATING SAME

(71) Applicants: Tamotsu Ikeda, Tokyo (JP); Toshio Ogiso, Tokyo (JP)

(72) Inventors: Tamotsu Ikeda, Tokyo (JP); Toshio Ogiso, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/063,326

(22) Filed: Dec. 8, 2022

(65) Prior Publication Data

US 2023/0236533 A1 Jul. 27, 2023

(30) Foreign Application Priority Data

Jan. 26, 2022 (JP) ................................ 2022-010295

(51) Int. Cl.
*G03G 15/20* (2006.01)

(52) U.S. Cl.
CPC ..... *G03G 15/2028* (2013.01); *G03G 15/2064* (2013.01); *G03G 15/2053* (2013.01); *G03G 2215/2061* (2013.01)

(58) Field of Classification Search
CPC ....................... G03G 15/2064; G03G 15/2028
See application file for complete search history.

(56) References Cited

U.S. PATENT DOCUMENTS 5,493,377 A * 2/1996 Nishikawa ......... G03G 15/2028 399/328
7,429,995 B2 * 9/2008 Sato ................... G03G 15/6573 347/156
9,201,394 B2 * 12/2015 Hiraoka ............. G03G 15/2064
2008/0107436 A1 * 5/2008 Mikutsu ............... G03G 15/206 399/67

(Continued)

FOREIGN PATENT DOCUMENTS

JP 2013225039 A * 10/2013 ......... G03G 15/2028
JP 2016-133597 7/2016
JP 2021051102 A * 4/2021 ......... G03G 15/2032

OTHER PUBLICATIONS

U.S. Appl. No. 17/825,471, filed May 26, 2022, Seiji Saitoh, et al.

*Primary Examiner* — Arlene Heredia
(74) *Attorney, Agent, or Firm* — Harness, Dickey & Pierce, P.L.C.

(57) ABSTRACT

A fixing device includes a fixing rotator, a pressure rotator, a pressure plate, a pressing force adjuster, an entrance guide, an exit guide, and a guide. The pressure rotator presses the fixing rotator to form a nip between the fixing rotator and the pressure rotator. The pressure plate rotates about a fulcrum to press the pressure rotator. The pressing force adjuster adjusts a pressing force of the pressure rotator. The entrance guide guides a recording medium entering the nip. The exit guide guides the recording medium ejected from the nip. The guide guides the pressure rotator in a direction inclined from a line connecting a rotation center of the fixing rotator and a rotation center of the pressure rotator toward downstream in a conveyance direction of the recording medium.

9 Claims, 11 Drawing Sheets

(56) References Cited

U.S. PATENT DOCUMENTS

| | | | | |
|---|---|---|---|---|
| 2010/0189478 | A1* | 7/2010 | Takahashi | G03G 15/2032 399/331 |
| 2011/0236069 | A1* | 9/2011 | Arikawa | G03G 15/2028 399/329 |
| 2013/0004222 | A1* | 1/2013 | Sakaya | B65H 5/36 271/226 |
| 2013/0279957 | A1* | 10/2013 | Kasama | G03G 15/2064 399/329 |
| 2015/0117920 | A1* | 4/2015 | Moteki | G03G 15/2028 399/323 |
| 2022/0373950 | A1* | 11/2022 | Ogiso | G03G 15/2028 |

* cited by examiner

FIG. 28
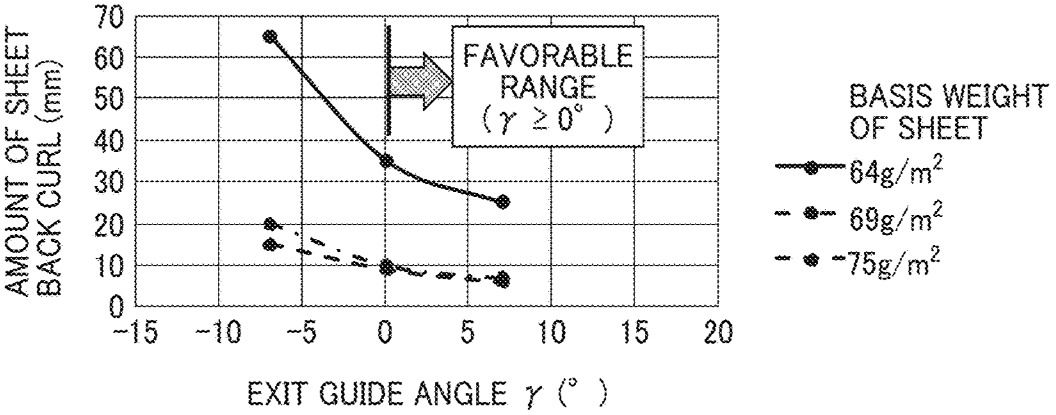
FIG. 29A
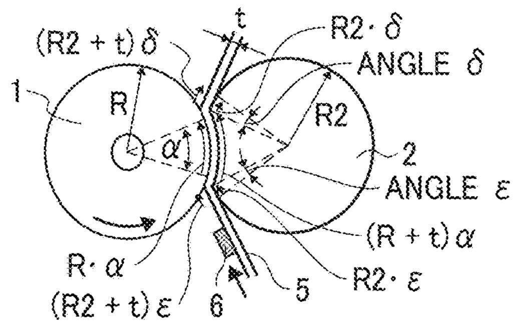
FIG. 29B
| | A | B | |
|---|---|---|---|
| | PRINTED SURFACE OF ENVELOPE | NON-PRINTED SURFACE OF ENVELOPE | A−B |
| SPACE AROUND ENTRANCE GUIDE | $(R2 + t)\varepsilon$ | $R2 \cdot \varepsilon$ | $t \cdot \varepsilon$ |
| NIP | $R \cdot \alpha$ | $(R + t)\alpha$ | $-t \cdot \alpha$ |
| SPACE AROUND EXIT GUIDE | $(R2 + t)\delta$ | $R2 \cdot \delta$ | $t \cdot \delta$ |
| | |
|---|---|
| TOTAL DIFFERENCE OF (A − B) | $t(\varepsilon + \delta - \alpha)$ |

FIXING DEVICE INCLUDING A PRESSURE ROTATOR SETTING AN EXIT GUIDE ANGLE AND IMAGE FORMING APPARATUS INCORPORATING SAME

CROSS-REFERENCE TO RELATED APPLICATION

This patent application is based on and claims priority pursuant to 35 U.S.C. § 119(a) to Japanese Patent Application No. 2022-010295, filed on Jan. 26, 2022, in the Japan Patent Office, the entire disclosure of which is hereby incorporated by reference herein.

BACKGROUND

Technical Field

Embodiments of the present disclosure generally relate to a fixing device and an image forming apparatus incorporating the fixing device.

Related Art

One type of image forming apparatus includes a fixing device to fix an image onto a sheet. Since the fixing device heats, presses, and conveys the sheet, a crease may be generated in the sheet while the sheet passes through the fixing device.

SUMMARY

This specification describes an improved fixing device that includes a fixing rotator, a pressure rotator, a pressure plate, a pressing force adjuster, an entrance guide, an exit guide, and a guide. The pressure rotator presses the fixing rotator to form a nip between the fixing rotator and the pressure rotator. The pressure plate rotates about a fulcrum to press the pressure rotator. The pressing force adjuster adjusts a pressing force of the pressure rotator. The entrance guide guides a recording medium entering the nip. The exit guide guides the recording medium ejected from the nip. The guide guides the pressure rotator in a direction inclined from a line connecting a rotation center of the fixing rotator and a rotation center of the pressure rotator toward downstream in a conveyance direction of the recording medium.

This specification also describes an image forming apparatus including the fixing device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 28 is a graph illustrating a relationship between the exit guide angle and an amount of the sheet back curl of the sheet of plain paper printed on the one side;

FIG. 29A is a diagram illustrating parameters relating an envelope crease and conveyance amounts of the printed surface and the non-printed surface of the envelope in a space around the entrance guide, the nip, and a space around the exit guide when the entrance guide and the exit guide are set so as to reduce the envelope crease; and FIG. 29B is a table illustrating the conveyance amounts of the printed surface and the non-printed surface of the envelope in the space around the entrance guide, the nip, and the space around the exit guide and differences between the conveyance amounts of the printed surface and the conveyance amounts of the non-printed surface when the entrance guide and the exit guide are set so as to reduce the envelope crease.

Figure 1:
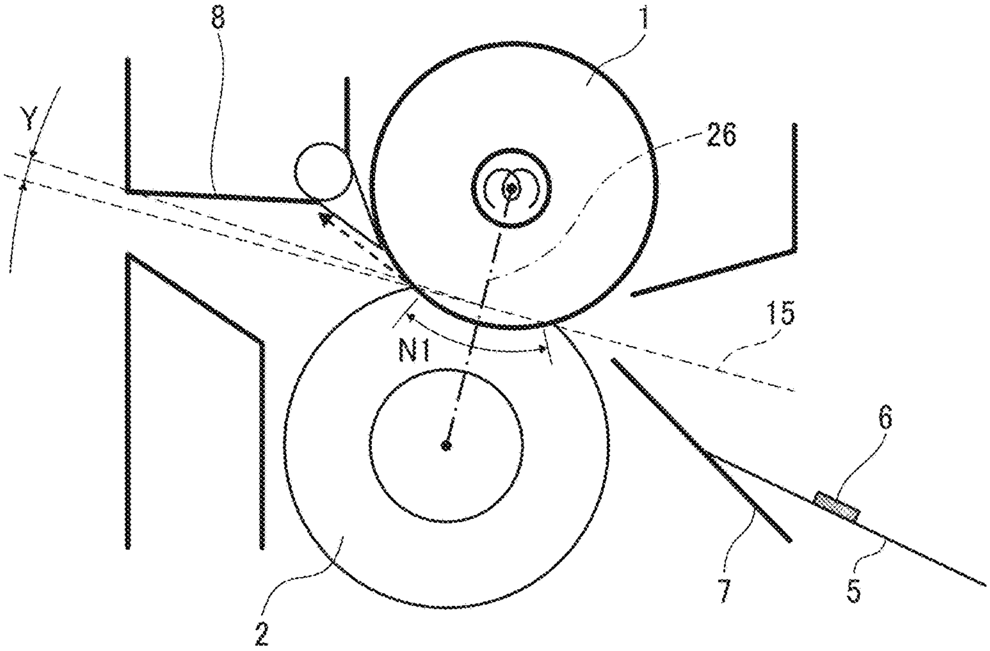
FIG. 1 is a schematic diagram illustrating a configuration example of a fixing device according to a first embodiment of the present disclosure forming a first nip to fix a toner image on a sheet of plain paper.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, descriptions are given below of embodiments of the present disclosure. In the drawings illustrating the following embodiments, the same reference numbers are allocated to elements having the same function or shape and redundant descriptions thereof are omitted below.

An electrophotographic image forming apparatus includes a fixing device that heats toner of a toner image to fix the toner image onto a sheet. The fixing device includes an entrance guide to guide the sheet being conveyed from a transfer device upstream from the fixing device and entering the fixing device. In addition, the fixing device includes an exit guide to guide the sheet ejected from the fixing device. The sheet guided by the exit guide is conveyed to a sheet ejection device downstream from the fixing device. The fixing device includes a fixing rotator such as a fixing roller and a pressure rotator such as a pressure roller. The pressure rotator presses the fixing rotator to form a fixing nip. Hereinafter, the fixing nip is simply referred to as a nip.

The fixing device heats and presses the toner on the sheet in the nip to fix the toner onto the sheet. Conveying the sheet in the nip may put a crease in the sheet. When the image forming apparatus forms images on both sides of the sheet, respectively, that is, in a double-sided printing mode, an end of the sheet may curl after the image is formed on one side of the sheet. The sheet having the curl at the end of the sheet enters the nip when the image forming apparatus forms the image on the other side of the sheet. In this case, positions at a leading edge of the sheet in an axial direction of the fixing rotator or the pressure rotator enter the nip at different timings, which causes the crease in the sheet. Since an envelope is made by folding and layering a sheet, a difference between velocities of the front side and the back side of the envelope occurs when the envelope is nipped and conveyed by the fixing rotator and the pressure rotator, which causes the crease in the envelope. Hereinafter, the crease in the envelope is referred to as an envelope crease. In particular, a thin envelope having a basis weight of 80 $g/m^2$ or less is likely to generate the envelope crease.

To prevent the occurrence of the crease, an angle of the sheet entering the nip and an angle of the sheet ejected from the nip are adjusted.

With reference to FIGS. 19 to 29, the following describes how the crease occurs and a relationship among the occurrence of the crease and angles of the entrance guide and the exit guide in the fixing device. The entrance guide is near an entrance of the nip, and the exit guide is near an exit of the nip. The following describes the occurrence of the crease in the envelope and the occurrence of the crease in a sheet of plain paper. The sheet of plain paper and the envelope are examples of recording media on which the image forming apparatus forms the toner image.

Firstly, the following describes how the nip having a curvature generates the envelope crease.

The fixing device includes a pair of rotators such as the fixing rotator and the pressure rotator. The rotators heat and press the envelope bearing an unfixed toner image under a predetermined pressure condition and a predetermined temperature condition to fix the toner image onto the envelope passing through the nip. Under the predetermined pressure condition, one of the pair of the rotators may have a convex shape in the nip, and the other one of the pair of the rotators may have a concave shape in the nip. For example, the pressure roller softer than the fixing roller elastically deforms to form the nip.

In the envelope formed by layering two sheets, a curvature radius between a printed surface of the envelope and a center of the rotator having the convex shape is different from a curvature radius between a non-printed surface of the envelope and the center of the rotator having the convex shape. As a result, a velocity of a center portion of a surface of the envelope in the axial direction of the rotator on the rotator having the concave shape is faster than a velocity of an end of the surface of the envelope in the axial direction on the rotator having the concave shape. The difference in the velocities is likely to cause the envelope crease. The above is described below in detail with reference to FIGS. 19, 20A, and 20B.

Figure 19:
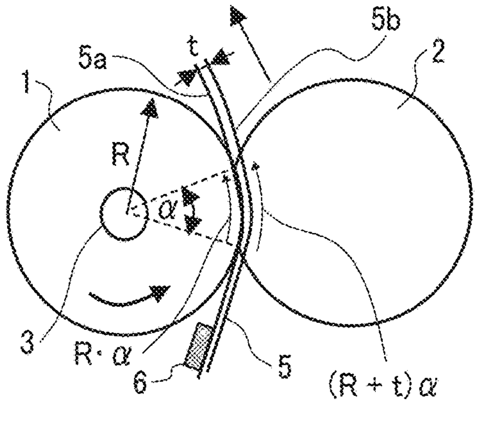
FIG. 19 is a diagram to illustrate a difference between a conveyance amount of the front side of an envelope and a conveyance amount of the back side of the envelope during printing the toner image on the envelope.

FIG. 19 is a diagram to illustrate a difference between a conveyance amount of the front side of the envelope and a conveyance amount of the back side of the envelope during printing the toner image on the envelope. FIG. 19 illustrates an example of the fixing device including rollers. The fixing device includes a fixing roller 1 incorporating a heater 3 and a pressure roller 2 pressing the fixing roller 1. The envelope as a sheet 5 has a thickness t and is sent to the nip. The nip has an angle α at the circumference. The surface of the envelope on which a toner image 6 is placed is a printed surface 5*a*, and the surface on which the toner image 6 is not placed is a non-printed surface 5*b*. The conveyance amount (that is also referred to as a "feed amount") of the non-printed surface 5*b* in the nip is (R+t) α, which is larger than the conveyance amount R α of the printed surface 5*a* in the nip by t α.

Figure 20A:
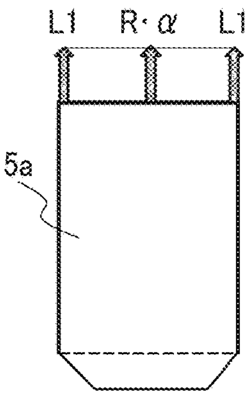
FIG. 20A is a diagram illustrating a conveyance amount distribution of a printed surface of the envelope during printing the toner image on the envelope.
Figure 20B:
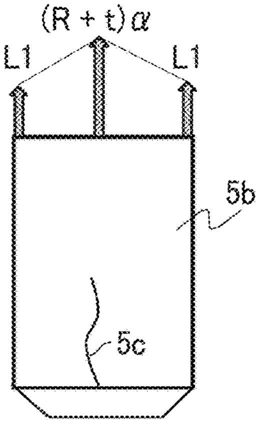
FIG. 20B is a diagram illustrating a conveyance amount distribution of a non-printed surface of the envelope during printing the toner image on the envelope.

FIG. 20A is a diagram illustrating a conveyance amount distribution in the printed surface 5*a* of the envelope in the axial direction when the toner image is printed on the envelope. FIG. 20B is a diagram illustrating a conveyance amount in the non-printed surface 5*b* of the envelope in the axial direction when the toner image is printed on the envelope. Since both ends of the envelope in the axial direction are a folded portion in which the sheet is folded or a glued portion in which the ends of the sheet are glued, both ends of the printed surface 5*a* in the axial direction and both ends of the non-printed surface 5*b* in the axial direction are conveyed by the same conveyance amount L1. The conveyance amount L1 is substantially equal to a conveyance amount R α of the center of the printed surface 5*a* in the axial direction.

However, the center of the non-printed surface 5*b* in the axial direction can freely move from the printed surface 5*a*. The conveyance amount ((R+t) α) of the non-printed surface 5*b* is larger than the conveyance amount (R α) of the printed surface 5*a*. The conveyance amount distribution of the non-printed surface 5*b* in the axial direction has a larger conveyance amount at the center than both ends in the axial direction, that is, ((R+t)α>L1). As a result, a trailing end crease 5*c* occurs as illustrated in FIG. 20B.

Reducing the angle α in FIG. 19, that is, narrowing the width of the nip reduces the trailing end crease 5*c*. The fixing device in the embodiments described below includes a pressing force adjuster that reduces a pressing force of the pressure roller pressing the fixing roller to reduce the angle α in FIG. 19 and reduces the crease in the envelope when the image forming apparatus prints the toner image on the envelope.

Secondary, the following describes a condition of the entrance guide to prevent the occurrence of the crease in a large sheet of plain paper in the double-sided printing mode.

When the image forming apparatus prints the toner images on both sides of the large sheet of plain paper, the end of the sheet may curl after the image forming apparatus prints the toner image on one side of the sheet. When the sheet having the curl on the end enters the nip, positions of the leading edge of the sheet in the axial direction do not enter the nip at the same timing. The center of the sheet enters the nip earlier than the end of the sheet having the curl. As a result, the velocity of the center of the sheet in the axial direction is faster than the velocity of the end of the sheet in the axial direction, which causes the crease in the sheet.

Figure 21:
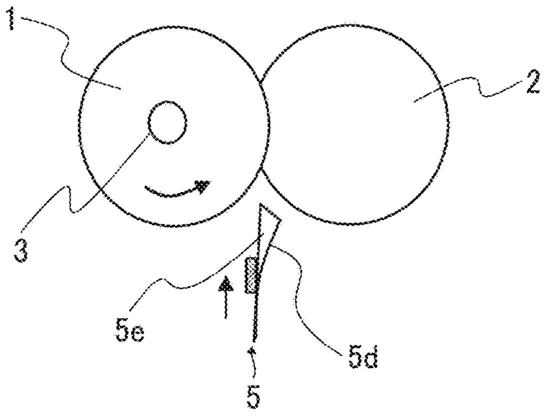
FIG. 21 is a diagram to illustrate an example of a posture of a sheet of plain paper having a curl occurred after single-sided printing and entering the fixing device during double-sided printing.
Figure 22:
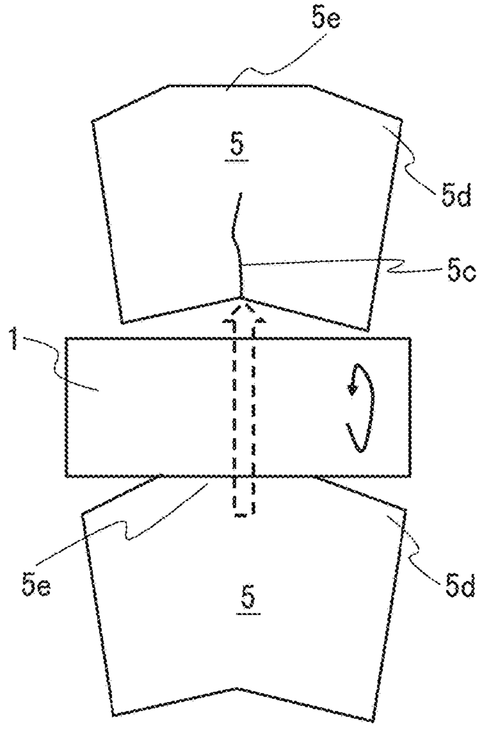
FIG. 22 is a diagram to illustrate an example of the posture of the sheet of plain paper having the curl occurred after the single-sided printing and entering the fixing device during the double-sided printing and an example of a posture of the sheet of plain paper ejected from the fixing device.

The following describes the crease with reference to FIGS. 21 and 22.

FIG. 21 is a diagram to illustrate an example of a posture of the sheet of plain paper (in a vertical section of the fixing device). The sheet has the curl occurred after single-sided printing and enters the fixing device during double-sided printing. FIG. 22 is a diagram to illustrate an example of the posture, in a longitudinal direction of the fixing roller, of the sheet of plain paper having the curl occurred after the single-sided printing and entering the fixing device during the double-sided printing and an example of a posture, in the longitudinal direction of the fixing roller, of the sheet of plain paper ejected from the fixing device.

FIG. 21 illustrates the posture of the sheet of plain paper as the sheet 5 with curled ends 5*d* before entering the nip. The end 5*d* of the sheet 5 in the axial direction is farther away from the nip than a center 5*e* of the sheet 5 in the axial direction. FIG. 22 illustrates states before and after the sheet 5 with curled ends enters the nip. When the sheet enters the nip, the center 5*e* of the sheet 5 enters the nip earlier than the end 5*d*, and the sheet 5 is conveyed as it is and heated and pressed at the nip. As a result, the crease 5*c* occurs in the sheet 5.

Figure 23:
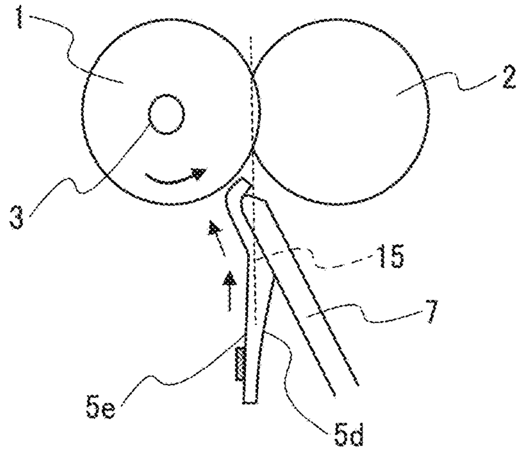
FIG. 23 is a diagram illustrating an example of the fixing device including the entrance guide to reduce a crease in the sheet of plain paper.

In order to avoid the occurrence of the crease, the entrance guide guides the sheet. FIG. 23 is a diagram illustrating an example of the fixing device including an entrance guide 7 to reduce the crease in the sheet of plain paper. The entrance guide 7 in the fixing device is around a portion of the nip into which the sheet enters. As illustrated in FIG. 23, the sheet 5 with the curled end abuts against the entrance guide 7. The entrance guide 7 guides the center of the sheet and the end of the sheet together to the fixing roller 1 and reduces the curl of the end. As a result, positions of the leading edge of the sheet 5 in the axial direction enter the nip at the same timing, and the sheet is conveyed by rotations of the fixing roller 1. Thus, the occurrence of the crease is prevented.

Thirdly, the following describes an angle condition of the entrance guide and an angle condition of the exit guide to favorably reduce the crease in the sheet of plain paper printed on both sides and the envelope crease.

Figure 24:
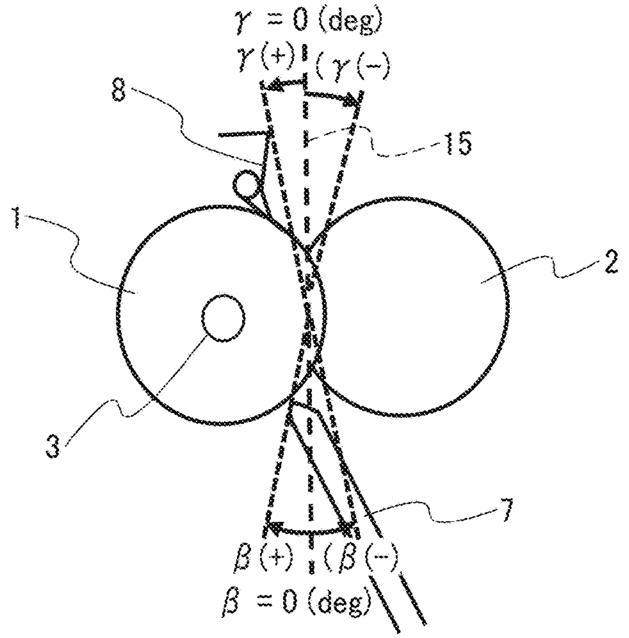
FIG. 24 is a diagram to illustrate an entrance guide angle and an exit guide angle.

With reference to FIG. 24, an entrance guide angle β and an exit guide angle γ are defined. The entrance guide angle β relates to an angle at which the sheet 5 enters the nip. The exit guide angle γ relates to an angle at which the sheet 5 is ejected from the nip. The entrance guide 7 is disposed near the entrance of the nip, and an exit guide 8 is disposed near the exit of the nip. In this specification, the entrance guide is also referred to as an approach guide, the exit guide is also referred to as an ejection guide. In addition, the center of the nip is referred to as a nip center.

As illustrated in FIG. 24, the entrance guide angle β and the exit guide angle γ are defined using the center of the nip and a straight line 15 connecting the entrance of the nip and the exit of the nip that is referred to as a reference line. The entrance guide angle β is formed by the straight line 15 and a straight line connecting the center of the nip and a tip of the entrance guide 7 (that is, a downstream end of the entrance guide 7 in a sheet conveyance direction). The exit guide angle γ is formed by the straight line 15 and a straight line connecting the center of the nip and a tip of the exit guide 8.

Both angles β and γ are zero (0) on the straight line 15 connecting the entrance of the nip and the exit of the nip. The angles β is expressed by positive values if the straight line connecting the center of the nip and the tip of the entrance guide is inclined toward the rotator having the convex shape in the nip. The angles β is expressed by negative values if the straight line connecting the center of the nip and the tip of the entrance guide is inclined toward the rotator having the concave shape in the nip. The angles γ is expressed by positive values if the straight line connecting the center of the nip and the tip of the exit guide is inclined toward the rotator having the convex shape in the nip. The angles γ is expressed by negative values if the straight line connecting the center of the nip and the tip of the exit guide is inclined toward the rotator having the concave shape in the nip. In FIG. 24, the fixing roller is the rotator having the convex shape in the nip, and the pressure roller 2 is the rotator having the concave shape in the nip. The center of the nip is a center position between the entrance of the nip and the exit of the nip on the straight line 15 connecting the entrance of the nip and the exit of the nip, in other words, the center point that divides the nip into two.

Figure 25:
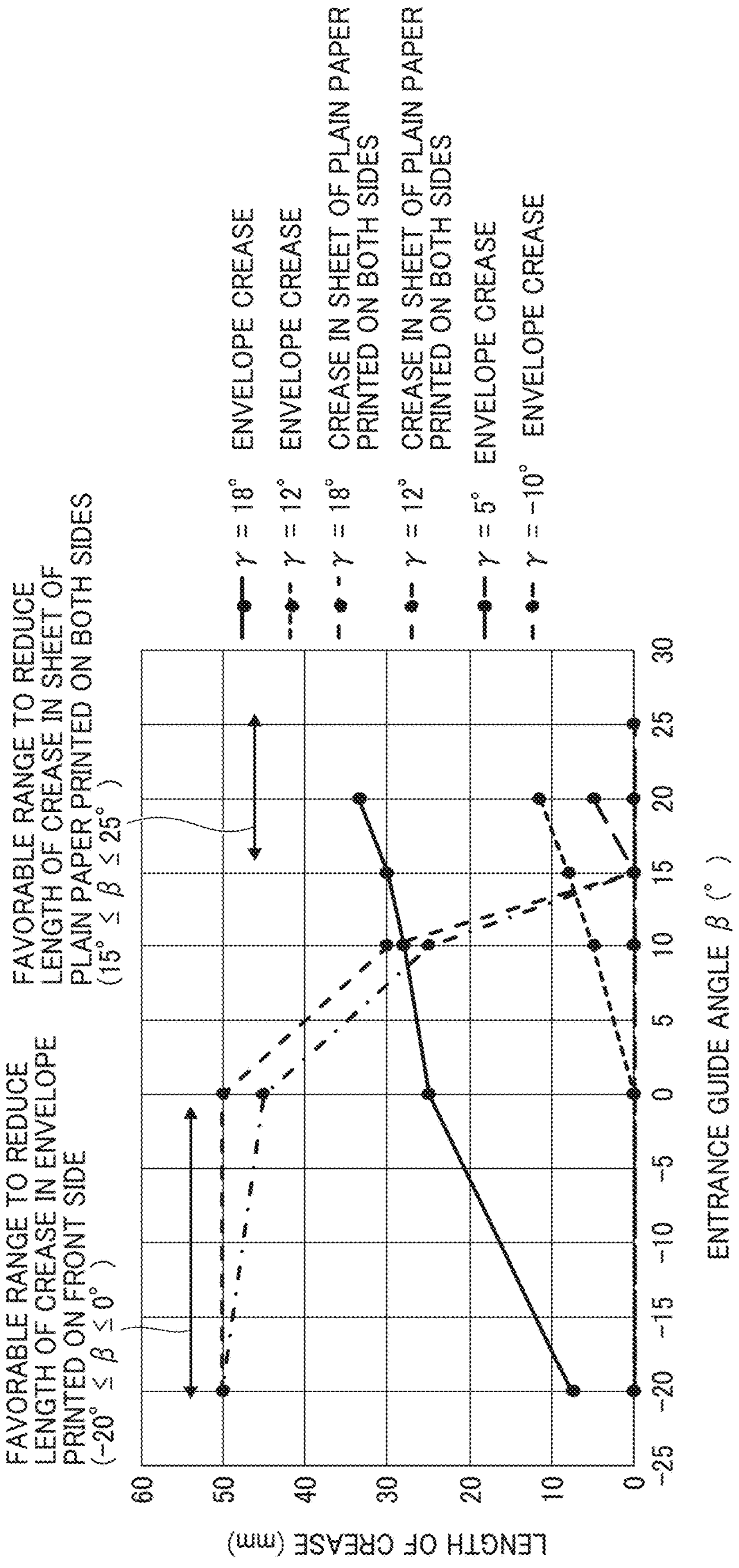
FIG. 25 is a graph illustrating relationships between the entrance guide angle and the envelope crease length in the envelope printed on one side in some different exit guide angles and relationships between the entrance guide angle and the crease length in the sheet of plain paper printed on both sides in some different exit guide angles.

FIG. 25 is a graph illustrating relationships between the entrance guide angle β and a length of the crease in the envelope printed on one side in some different exit guide angles γ and relationships between the entrance guide angle β and a length of the crease in the sheet of plain paper printed on both sides in some different exit guide angles γ. FIG. 25 illustrates results of tests performed under the following test conditions.

Test Conditions:

The width of the nip when the image forming apparatus prints the toner image on the envelope: 2.5 mm The width of the nip when the image forming apparatus prints the toner image on the sheet of plain paper: 7.7 mm A fixing temperature when the image forming apparatus prints the toner image on the envelope: 210° C.

A fixing temperature when the image forming apparatus prints the toner image on the sheet of plain paper: 170° C.

A printing speed when the image forming apparatus prints the toner image on the envelope: 180 mm/s A printing speed when the image forming apparatus prints the toner image on the sheet of plain paper: 252 mm/s The envelope crease was evaluated by an average of envelope crease lengths occurred in envelopes having basis weights of 70 $g/m^2$, 80 $g/m^2$, 90 $g/m^2$, and 100 $g/m^2$. The crease in the sheet of plain paper was evaluated by the sheet of plain paper having the basis weight of 69 $g/m^2$.

From the results of the tests, the following was found. To reduce the envelope crease, a favorable range of the entrance guide angle β is −20° or more and 0° or less (−20°≤β≤0°). To reduce the crease in the sheet of plain paper printed on both sides, a favorable range of the entrance guide angle β is 15° or more and 25° or less (15°≤β≤25°). The fixing device according to embodiments described below includes a pressing force adjuster. When the image forming apparatus prints the toner image on the envelope, the pressing force adjuster decreases a pressing force.

Figure 26:
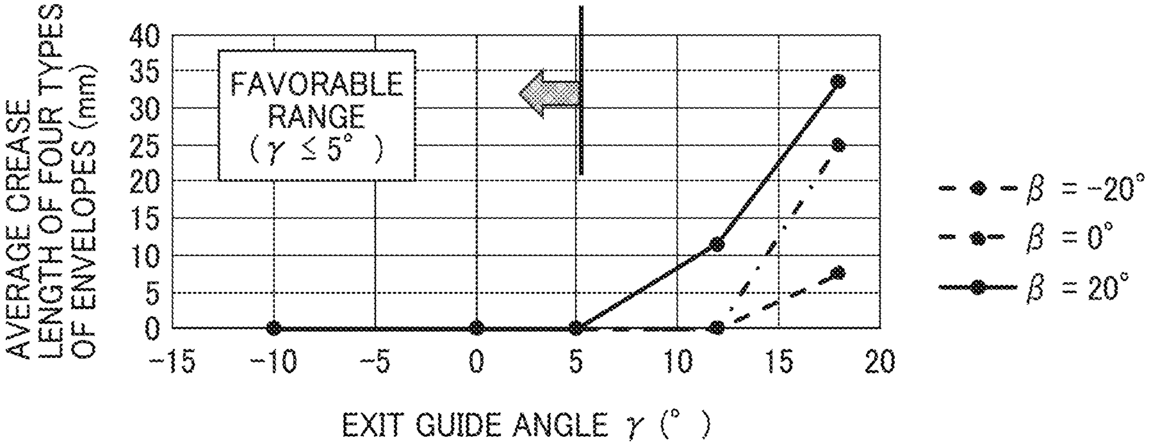
FIG. 26 is a graph illustrating relationships between the exit guide angle and the envelope crease length in some different entrance guide angles.
Figure 27A:
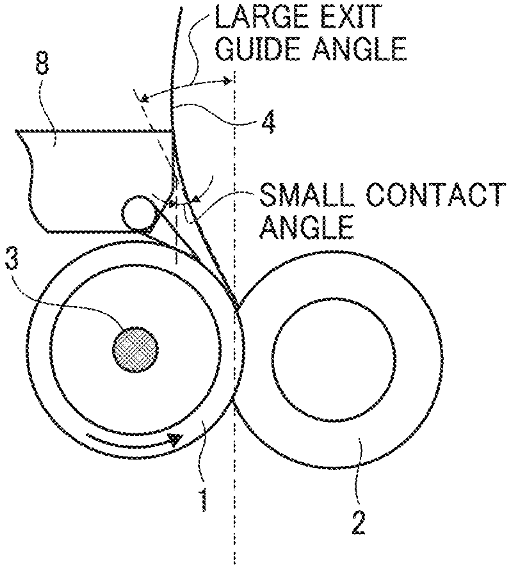
FIGS. 27A and 27B are diagrams illustrating a relationship between a sheet back curl and the exit guide angle.
Figure 27B:
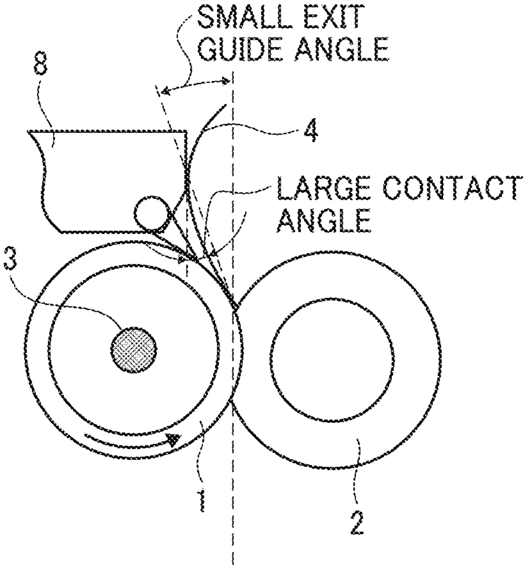

FIG. 26 is a graph illustrating relationships between the exit guide angle and the envelope crease length in some different entrance guide angles. FIGS. 27A and 27B are diagrams illustrating a sheet back curl that is curling of the sheet in a direction from the printed surface of the sheet toward the non-printed surface of the sheet. A certain exit guide angle causes the sheet back curl. In FIG. 27A, the exit guide is set so that the exit guide angle γ is large. In FIG. 27B, the exit guide is set so that the exit guide angle γ is small. As illustrated in FIG. 27A, setting the large exit guide angle γ decreases a contact angle formed by the exit guide 8 and the sheet of plain paper 5 ejected from the nip and increases a curvature radius formed by the sheet of plain paper 5. As a result, the large exit guide angle γ decreases the sheet back curl. In contrast, As illustrated in FIG. 27B, setting the small exit guide angle γ increases the contact angle formed by the exit guide 8 and the sheet of plain paper 5 ejected from the nip and decreases the curvature radius formed by the sheet of plain paper 5. As a result, the small exit guide angle γ increases the sheet back curl. As illustrated in FIG. 26, the large exit guide angle γ is likely to cause the envelope crease that deteriorates print quality. In contrast, as illustrated in FIGS. 27A and 27B, the small exit guide angle γ causes the large back curl of the sheet of plain paper.

FIG. 28 is a graph illustrating a relationship between the exit guide angle γ and an amount of the sheet back curl of the sheet of plain paper printed on the one side when the entrance guide angle β was set to be 20°. The amount of the sheet back curl was examined by each of sheets of plain paper having basis weights of 64 $g/m^2$, 69 $g/m^2$, and 75 $g/m^2$.

As illustrated in FIG. 28, the smaller the exit guide angle γ is, the larger the amount of the sheet back curl of the plain paper is, which deteriorates the print quality. From the results illustrated in FIG. 28, a favorable range of the exit guide angle γ to reduce the sheet back curl of the sheet of plain paper is 0° or more (γ≥0°). In contrast, from the results illustrated in FIG. 26, a favorable range of the exit guide angle γ to reduce the envelope crease is 5° or less (γ≤5°).

FIG. 29A is a diagram illustrating parameters relating the envelope crease when the entrance guide and the exit guide are set so as to reduce the envelope crease. The parameters relate to conveyance amounts of the printed surface of the envelope and conveyance amounts of the non-printed surface of the envelope in a space around the entrance guide, the nip, and a space around the exit guide. FIG. 29B is a table illustrating the conveyance amounts of the printed surface and the non-printed surface of the envelope in the space around the entrance guide, the nip, and the space around the exit guide when the entrance guide and the exit guide are set so as to reduce the envelope crease. In addition, the table includes differences between the conveyance amounts of the printed surface and the conveyance amounts of the non-printed surface in the space around the entrance guide, the nip, and the space around the exit guide.

To reduce the envelope crease, the entrance guide is set so that the entrance guide angle is equal to or smaller than zero (β≤0), and the exit guide is set so that the exit guide angle γ is smaller than zero (γ≤0). FIG. 29B illustrates conveyance amounts of the printed surface and the non-printed surface of the envelope made by layering two sheets. In addition, each column under the column indicated by (A-B) in FIG. 38B is the difference between the conveyance amount of the printed surface and the conveyance amount of the non-printed surface in the envelope.

While the envelope passes through the nip, the difference between the conveyance amount of the printed surface and the conveyance amount of the non-printed surface is −tα, which causes the crease. However, the envelope winds around the pressure roller 2 by a pressure roller winding angle c before the envelope enters the entrance of the nip and, after the envelope comes out of the nip, the envelope winds around the pressure roller by a pressure roller winding angle S. As a result, a total difference between the conveyance amount of the printed surface and the conveyance amount of the non-printed surface is t (ε+δ−α). Designing the pressure roller winding angles ε and δ to reduce t (ε+δ−α) enables reducing the envelope crease.

As described above, setting the entrance guide angle and the exit guide angle with respect to the straight line 15 connecting the entrance of the nip and the exit of the nip to be within a predetermined range enables preventing the occurrence of the crease in both the sheet of plain paper printed on both sides and the envelope.

However appropriate conditions for both the entrance guide angle and the exit guide angle are different between the envelope and the sheet of plain paper. Therefore, it is desirable to switch the entrance guide angle and the exit guide angle depending on the type of sheet.

Table 1 illustrates appropriate ranges of the entrance guide angle and the exit guide angle with respect to the straight line 15 connecting the entrance of the nip and the exit of the nip.

TABLE 1

| | Appropriate Guide Angle Range | |
|---|---|---|
| | Plain paper | Envelope |
| Entrance guide angle β | 15 to 25° | −20 to 0° |
| Exit guide angle γ | 0 to 15° | −10 to 5° |

To prevent the occurrence of the crease in the sheet of plain paper printed the toner image on both sides and the envelope and the occurrence of the sheet back curl of the sheet of plain paper printed the toner image on both sides, the fixing device according to the embodiments described below has the following feature. The pressure roller is pressed against the fixing roller and forms a first nip between the pressure roller and the fixing roller to fix the toner image onto the sheet of plain paper. To fix the toner image onto the envelope, the pressure roller is moved away from the fixing roller in a direction inclined from the straight line connecting the rotation center of the fixing roller and the rotation center of pressure roller toward downstream in the sheet conveyance direction to form a second nip.

Forming the second nip as described above changes the exit guide angle affected by the second nip, and the exit guide can suitably guide the envelope ejected from the second nip. The above-described configuration can set the exit guide angle with respect to the straight line 15 connecting the entrance of the nip and the exit of the nip to each of the best condition preventing the occurrence of the crease and the sheet back curl in the sheet of plain paper printed the toner image on both sides and the best condition preventing the occurrence of the crease in the envelope.

In an aspect of the embodiments of the present disclosure, the fixing device includes a fixing rotator such as the fixing roller 1, a pressure rotator such as the pressure roller 2, a pressure plate such as a pressure arm 10, the pressing force adjuster such as a cam 9, an entrance guide such as the entrance guide 7, an exit guide such as the exit guide 8, and a guide such as a structure to receive a bearing of the pressure roller 2. The above-described parts with reference numerals are examples and illustrated in FIGS. 1 to 4. The pressure rotator presses against the fixing rotator to form the nip. The pressure plate rotates about a rotation fulcrum such as a fulcrum 14 and presses the pressure rotator. The pressing force adjuster adjusts the pressing force of the pressure plate. The entrance guide guides a recording medium such as the sheet 5 entering the nip. The exit guide guides the recording medium ejected from the nip. The pressing force adjuster moves the pressure plate to decrease the pressing force. The guide guides the pressure rotator in a direction inclined from the straight line connecting the rotation center of the fixing roller and the rotation center of the pressure roller toward downstream in a conveyance direction of the recording medium.

In the fixing device of the present embodiments, the pressure rotator moves away from the fixing rotator in the direction inclined from the straight line connecting the rotation center of the fixing roller and the rotation center of the pressure roller toward downstream in the sheet conveyance direction to fix the toner image onto the envelope, which changes a conveyance path of the envelope and prevents the occurrence of the crease in the envelope. The above-described simple configuration in the fixing device according to the present embodiments enables suitably setting an angle between the envelope ejected from the nip and the exit guide and reducing the size and cost of the image forming apparatus.

The following describes specific embodiments.

A first embodiment is described below.

Figure 2:
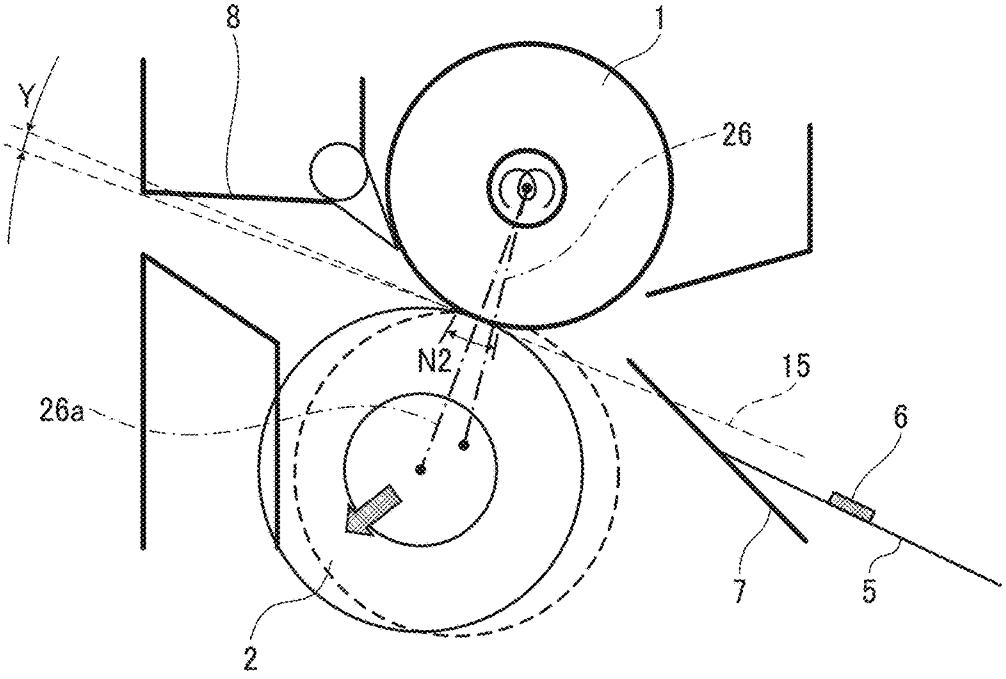
FIG. 2 is a schematic diagram illustrating a configuration example of the fixing device of FIG. 1 forming a second nip to fix the toner image on an envelope.
Figure 3:
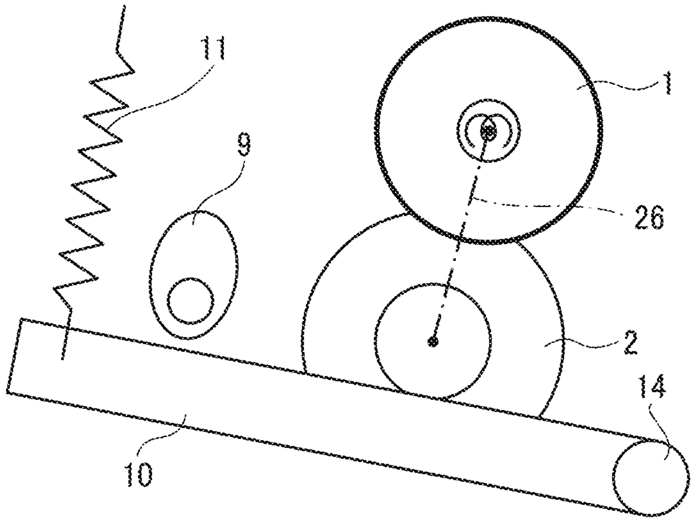
FIG. 3 is a schematic diagram illustrating a configuration example of a pressing mechanism forming the first nip in the fixing device according to the first embodiment.
Figure 4:
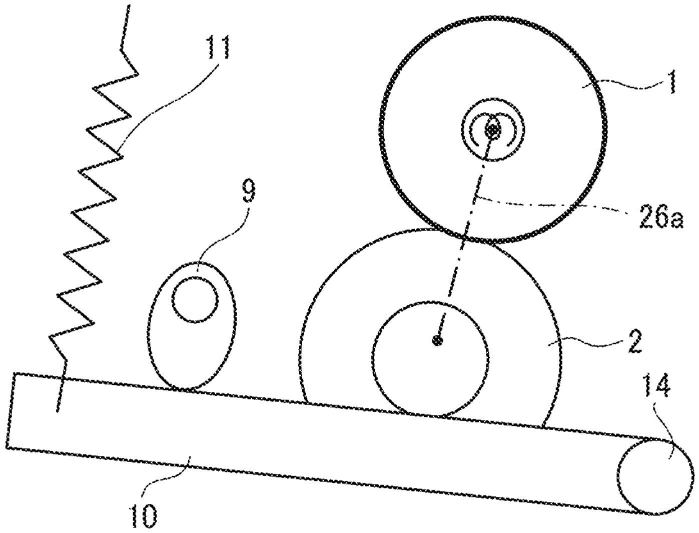
FIG. 4 is a schematic diagram illustrating a configuration example of the pressing mechanism forming the second nip in the fixing device of FIG. 3.
Figure 5:
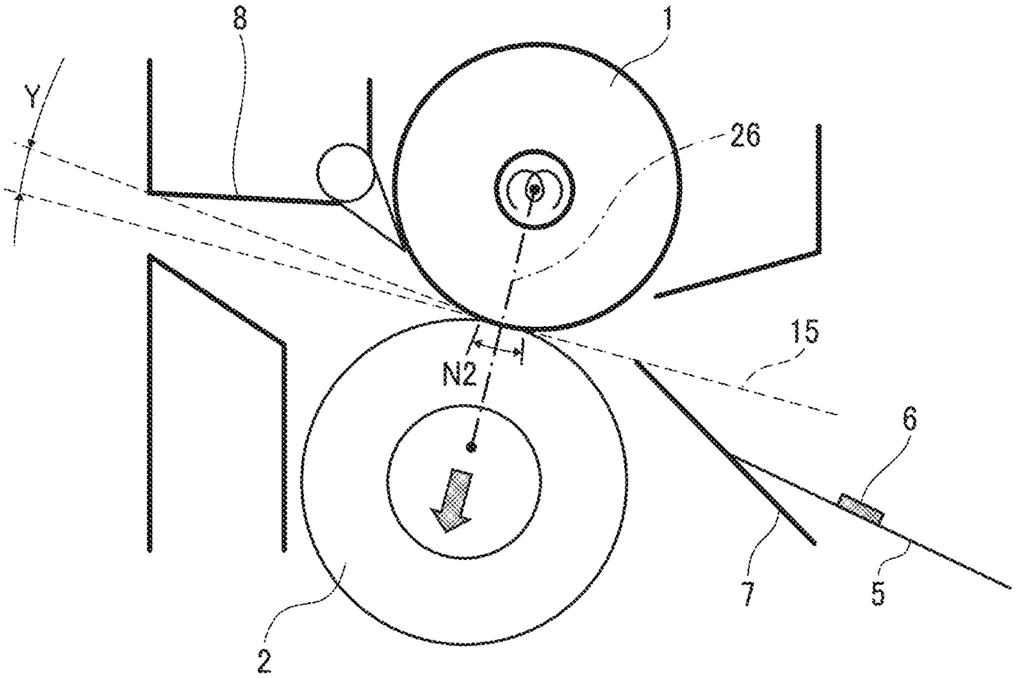
FIG. 5 is a schematic diagram illustrating a configuration example of a fixing device according to a comparative embodiment forming the second nip.

FIG. 1 is a schematic diagram illustrating the fixing device according to the first embodiment of the present disclosure forming the first nip to fix the toner image on the sheet of plain paper. FIG. 2 is a schematic diagram illustrating the fixing device forming the second nip to fix the toner image on the envelope. FIG. 3 is a schematic diagram illustrating a pressing mechanism in the fixing device forming the first nip according to the first embodiment. FIG. 4 is a schematic diagram illustrating the pressing mechanism forming the second nip in the fixing device according to the first embodiment. FIG. 5 is a schematic diagram illustrating a fixing device according to a comparative embodiment forming the second nip. The fixing device of the present embodiment includes the fixing roller 1, the pressure roller 2, the entrance guide 7, the exit guide 8, the cam 9, the pressure arm 10, and a pressure spring 11.

The sheet 5 as an example of a recording medium is conveyed as follows.

After a transfer roller 30 transfers the toner image 6 from a photoconductor 31 onto the sheet 5, the sheet 5 enters the fixing device. In the fixing device, the sheet 5 enters the nip in which the fixing roller 1 is in contact with the pressure roller 2 and is heated and pressed to fix the toner image 6 onto the sheet 5. The nip is a portion indicated by N1 in FIG. 1 and indicated by N2 in FIG. 2. The entrance guide 7 is disposed near the entrance of the nip. The exit guide 8 is disposed near the exit of the nip. The entrance guide 7 and the exit guide 8 guide the sheet 5 conveyed.

In FIG. 3, the pressure spring 11 applies force to the pressure arm 10 to generate the pressing force of the pressure roller 2 that presses the fixing roller 1. The position of the cam 9 changes the pressing force. The position of the cam 9 illustrated in FIG. 3 increases the pressing force. The position of the cam 9 illustrated in FIG. 4 decreases the pressing force. The pressure arm 10 is rotatable about the fulcrum 14. The cam 9 can set the pressure arm 10 at any of a plurality of positions in a rotation direction with respect to the fulcrum 14. When the sheet of plain paper passes through the fixing device, the cam 9 sets the position of the pressure arm 10 that sets the maximum pressing force, which is referred to as an increased pressure state, and the position of the pressure roller 2 at this time is referred to as a maximum pressure position. When the envelope passes through the fixing device, the cam 9 sets the position of the pressure arm 10 that decrease the pressing force from the maximum pressing force, which is referred to as a decreased pressure state, and the position of the pressure roller 2 at this time is referred to as an envelope position. The above-described configuration can change the pressing force and switch between the best condition for fixing the toner image onto the sheet of plain paper and the best condition for fixing the toner image onto the envelope.

The width of the nip is referred to as a nip width below. A nip width N1 illustrated in FIG. 1 is greater than a nip width N2 illustrated in FIG. 2. In FIG. 2, the pressure arm 10 decreases the pressing force. For example, N1=7.7 mm and N2=2.5 mm. In the following description, the nip having the nip width N1 and being formed when the sheet of plain paper passes through the fixing device (in other words, when the image forming apparatus prints the toner image on the sheet of plain paper) is referred to as the first nip, and the nip having the nip width N2 and being formed when the envelope passes through the fixing device (in other words, when the image forming apparatus prints the toner image on the envelope) is referred to as the second nip.

As illustrated in FIG. 2, the fixing device according to the first embodiment is designed so that the pressure roller 2 is retracted from the fixing roller 1 to form the second nip in the direction inclined from a straight line 26 connecting the rotation center of the fixing roller 1 and the rotation center of the pressure roller 2 at a position to pass the sheet of plain paper through the fixing device (in other words, the position in which the pressure roller 2 presses the sheet of plain paper) toward downstream in the sheet conveyance direction. The above-described configuration changes the exit guide angle formed by the second nip and the exit guide 8, and the exit guide 8 guides the envelope as the sheet 5 ejected from the nip.

FIG. 2 illustrates the straight line 26 connecting the rotation center of the fixing roller and the rotation center of the pressure roller pressing the sheet of plain paper and a straight line 26*a* connecting the rotation center of the fixing roller and the rotation center of the pressure roller pressing the envelope with the pressing force smaller than the pressing force to press the sheet of plain paper.

FIG. 5 illustrates the fixing device according to the comparative embodiment. In the comparative embodiment, the pressure roller 2 is not retracted in the direction inclined from the straight line connecting the rotation center of the fixing roller and the rotation center of the pressure roller pressing the sheet of plain paper toward downstream in the sheet conveyance direction of the sheet 5. The pressure roller 2 is retracted along the straight line 26 connecting the rotation center of the fixing roller 1 and the rotation center of the pressure roller 2 positioned to reduce the pressing force and form the second nip in the comparative embodiment.

As illustrated in FIG. 2, the pressure roller 2 in the first embodiment moves in a direction inclined from the straight line 26 toward downstream in the sheet conveyance direction by 7° to form the second nip. The exit guide angle between the line connecting the entrance of the second nip and the exit of the second nip and the line connecting the center of the second nip and the tip of the exit guide 8 is −5° that is smaller than the exit guide angle formed by the first nip illustrated in FIG. 1. As a result, the envelope crease can be reduced. Additionally, the exit guide angle illustrated in FIG. 2 in the first embodiment is smaller than the exit guide angle illustrated in FIG. 5 in the comparative embodiment. Therefore, moving the pressure roller 2 in the direction inclined from the straight line 26 toward downstream in the sheet conveyance direction can reduce the envelope crease.

Figure 6:
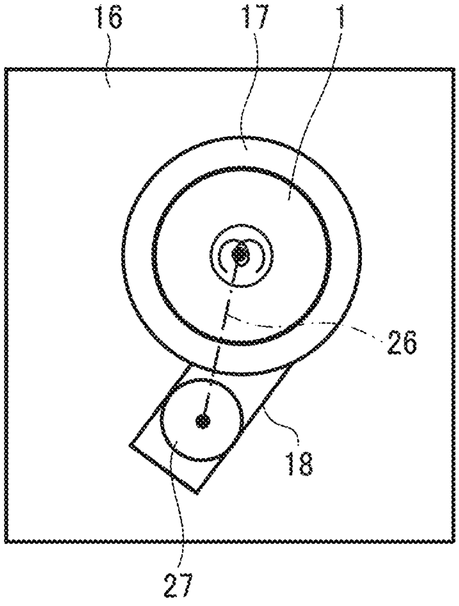
FIG. 6 is a schematic diagram illustrating a configuration example to hold a fixing roller and a pressure roller that form the first nip in the fixing device according to the first embodiment.
Figure 7:
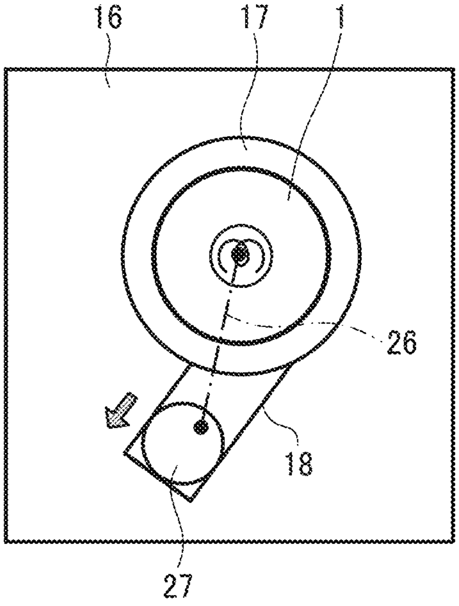
FIG. 7 is a schematic diagram illustrating a configuration example to hold the fixing roller and the pressure roller that form the second nip in the fixing device according to the first embodiment.
Figure 8:
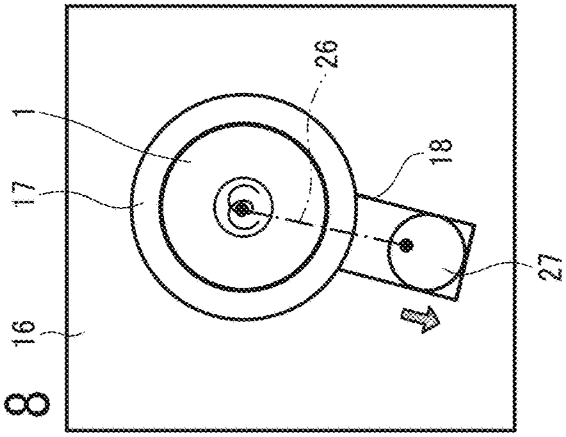
FIG. 8 is a schematic diagram illustrating a configuration example to hold the fixing roller and the pressure roller that form the second nip in the fixing device according to the comparative embodiment.

The following describes a configuration to hold the fixing roller 1 and the pressure roller 2. The fixing device preferably includes one member such as a side plate to hold the fixing roller 1 and the pressure roller 2. FIG. 6 is a schematic diagram illustrating the configuration to hold the fixing roller and the pressure roller that form the first nip in the fixing device according to the first embodiment. FIG. 7 is a schematic diagram illustrating the configuration to hold the fixing roller and the pressure roller that form the second nip in the fixing device according to the first embodiment. FIG. 8 is a schematic diagram illustrating the configuration to hold the fixing roller and the pressure roller that form the second nip in the fixing device according to the comparative embodiment.

A side plate 16 holding the fixing roller 1 and the pressure roller 2 has a shape to receive a fixing roller bearing 17 receiving a fixing roller shaft and a pressure roller bearing 27 receiving a pressure roller shaft. The shape to receive the pressure roller bearing 27 is a rail shape 18. The pressure roller bearing 27 can move along the rail shape 18.

As illustrated in FIG. 7, the pressure roller bearing 27 moves in the direction inclined from the straight line 26 connecting the rotation center of the fixing roller and the rotation center of the pressure roller toward downstream in the sheet conveyance direction to retract the pressure roller 2 and form the second nip, and the rail shape 18 in the side plate 16 accurately positions the pressure roller bearing 27. In other words, a portion having the rail shape 18 in the side plate 16 functions a guide guiding the pressure roller 2 in the direction inclined from the straight line 26 connecting the rotation center of the fixing roller and the rotation center of the pressure roller toward downstream in the sheet conveyance direction.

FIG. 8 illustrates a configuration in the fixing device according to the comparative embodiment to form the second nip. The pressure roller bearing 27 moves along the straight line 26 connecting the rotation center of the fixing roller and the rotation center of the pressure roller to form the second nip, and the rail shape 18 in the side plate 16 accurately positions the pressure roller bearing 27. The difference between the configuration illustrated in FIG. 7 and the configuration illustrated in FIG. 8 is a moving direction of the pressure roller 2.

The above-described one member such as the side plate holding the fixing roller 1 and the pressure roller 2 improves the positional accuracy of the fixing roller 1 and the pressure roller 2.

Figure 9:
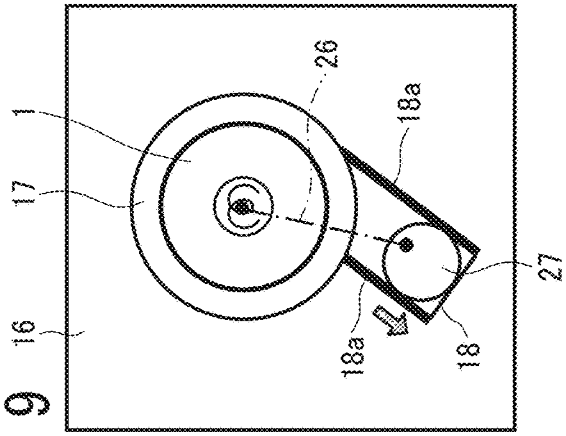
FIG. 9 is a schematic diagram illustrating a shape of a side plate to define a retracting direction in which the pressure roller moves away from the fixing roller in the fixing device of FIG. 7.

The shape in the side plate of the fixing device preferably defines a retracting direction in which the pressure roller 2 retracts from the fixing roller 1, that is, the direction inclined from the line connecting the center of the fixing roller 1 and the center of the pressure roller 2 toward downstream in the sheet conveyance direction. In FIG. 7, for example, the pressure roller bearing 27 moves along the rail shape 18 in the side plate 16. FIG. 9 illustrates the pressure roller 2 moving to a retracted position along shapes 18*a* in the side plate. The retracted position is the envelope position. Moving the pressure roller 2 in the retracting direction along the shapes 18*a* in the side plate to reduce the pressing force and fix the toner image onto the envelope as described above improves the positional accuracy of the pressure roller 2.

Figure 10:
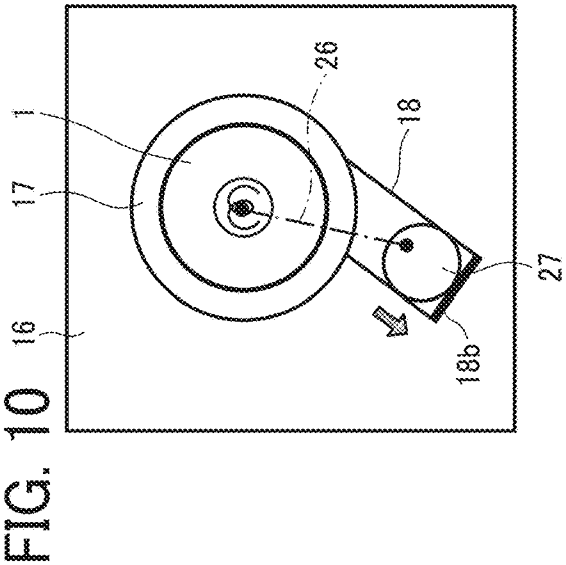
FIG. 10 is a schematic diagram illustrating a shape of the side plate to define a retracted position of the pressure roller in the fixing device of FIG. 7.

In addition to the shapes 18*a*, as illustrated in FIG. 10, a shape 18*b* in the side plate of the fixing device preferably defines the retracted position of the pressure roller 2 after the pressure roller 2 moves in the direction inclined from the line connecting the center of the fixing roller 1 and the center of the pressure roller 2 toward downstream in the sheet conveyance direction to retract from the fixing roller 1. In a small width of the nip to reduce the pressing force and fix the toner image onto the envelope, a large variation in the position of the pressure roller 2 causes a large variation in the width of the nip. The shapes 18*a* and 18*b* in the side plate defining the retracted position of the pressure roller 2 improves the positional accuracy of the pressure roller 2 and reduces the variation in the width of the fixing nip. The fixing device preferably includes the side plate 16 having the rail shape 18 that receives the pressure roller bearing 27 and defines at least one of the retracted position of the pressure roller 2 or the retracting direction of the pressure roller 2.

A second embodiment is described below.

Figure 11:
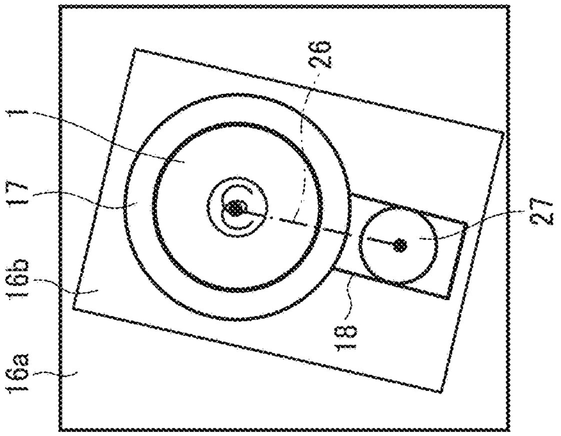
FIG. 11 is a schematic diagram illustrating a configuration example to hold the fixing roller and the pressure roller that form the first nip in the fixing device according to a second embodiment.
Figure 12:
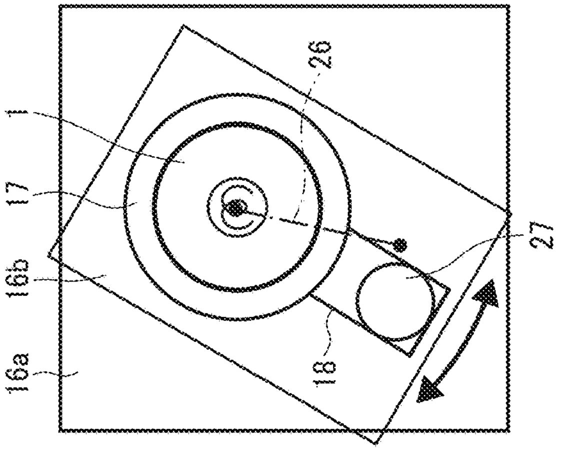
FIG. 12 is a schematic diagram illustrating a configuration example to hold the fixing roller and the pressure roller that form the second nip in the fixing device according to the second embodiment.

The fixing device according to the second embodiment has a different configuration to hold the fixing roller 1 and the pressure roller 2 from the configuration in the fixing device according to the first embodiment. FIG. 11 is a schematic diagram illustrating the configuration to hold the fixing roller and the pressure roller that form the first nip in the fixing device according to the second embodiment. FIG. 12 is a schematic diagram illustrating the configuration to hold the fixing roller and the pressure roller that form the second nip in the fixing device according to the second embodiment.

The fixing device according to the second embodiment includes two side plates 16*a* and 16*b*. The side plate 16*b* has the shape defining the retracted position of the pressure roller 2 after the pressure roller 2 moves in the direction inclined from the line connecting the center of the fixing roller 1 and the center of the pressure roller 2 toward downstream in the sheet conveyance direction to retract from the fixing roller 1. When the pressure arm 10 reduces the pressing force, the side plate 16*b* rotates to move the pressure roller 2 to a desired position in a desired direction. In the configuration including two side plates, rotating the side plate 16*b* with respect to the side plate 16*a* enables moving the pressure roller 2 to the retracted position in a large moving range of the pressure roller 2. In other words, the two side plates move the pressure roller 2 in the large moving range and position the pressure roller at the retracted position (in other words, the envelope position).

A third embodiment is described below.

Figure 13:
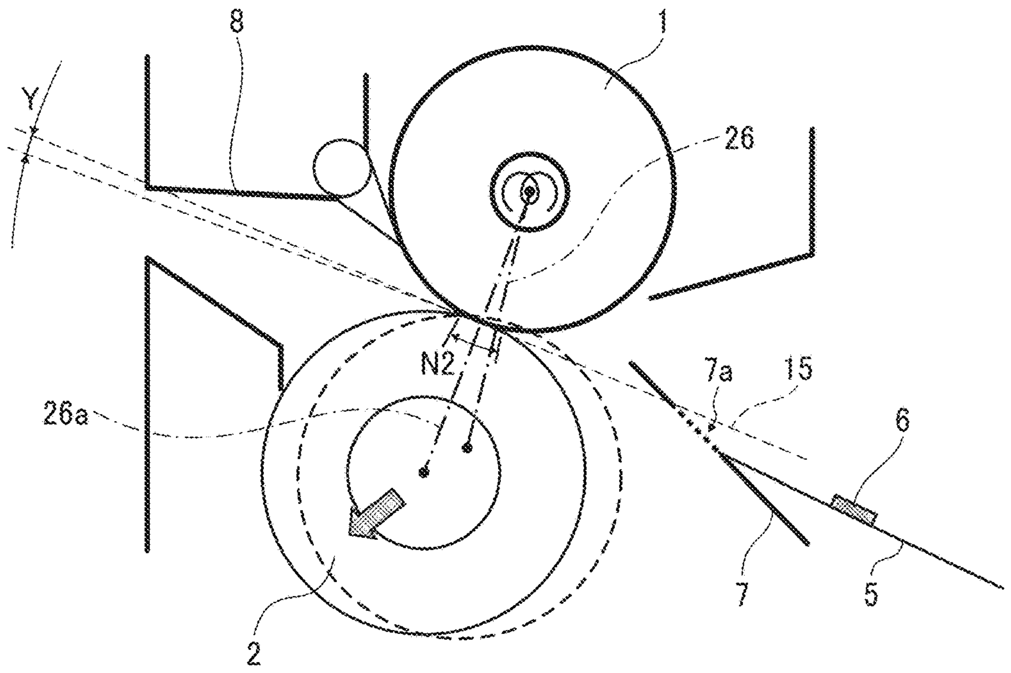
FIG. 13 is a schematic diagram illustrating an example of an entrance guide in the fixing device according to a third embodiment.

The fixing device according to the third embodiment includes a different entrance guide 7 from the fixing device according to the first and second embodiments and has the same configuration to move the pressure roller 2 as the fixing device according to the first or second embodiment. The entrance guide 7 in the fixing device according to the third embodiment has an opening. FIG. 13 is a schematic diagram illustrating the entrance guide 7 in the fixing device according to the third embodiment. The entrance guide 7 in the fixing device according to the third embodiment has an opening 7*a* through which the envelope as the sheet 5 passes when the image forming apparatus prints the toner image on the envelope. The opening 7*a* changes the entrance guide angle for the envelope and can prevent the occurrence of the crease in the envelope.

Figure 14:
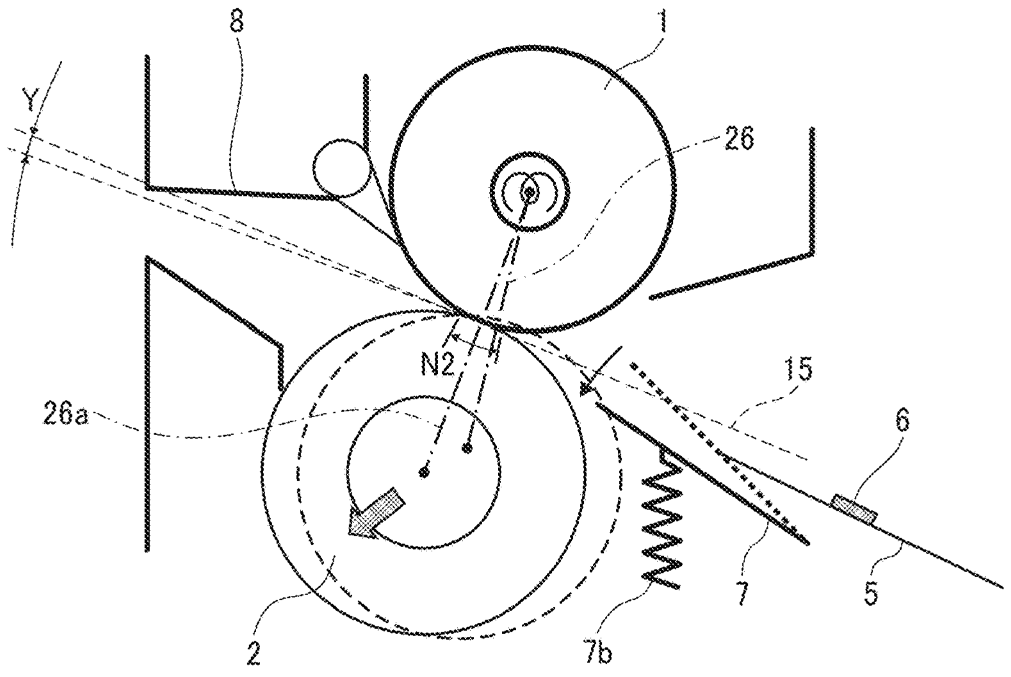
FIG. 14 is a schematic diagram illustrating another example of the entrance guide in the fixing device of FIG. 13.

The fixing device may have a movable entrance guide 7 as a variation of the third embodiment. FIG. 14 is a schematic diagram illustrating another example of the entrance guide in the fixing device according to the third embodiment. The tip of the entrance guide 7 is configured to be movable (retractable) and moves the tip of the entrance guide 7 to a position near the pressure roller 2 and prevent deformation of the envelope when the image forming apparatus prints the toner image on the envelope.

A spring 7*b* pushes up the tip of the entrance guide 7. The force of the spring 7*b* applied to the entrance guide 7 is adjusted so that a sheet having a low stiffness such as the sheet of plain paper cannot move the entrance guide when the sheet abuts the entrance guide. Therefore, the entrance guide guides the sheet having the low stiffness such as the sheet of plain paper to the fixing nip without moving. In addition, the force of the spring 7*b* applied to the entrance guide 7 is adjusted so that a sheet having a high stiffness such as the envelope moves the tip of the entrance guide 7 when the sheet abuts the entrance guide. Therefore, when the sheet having the high stiffness such as the envelope abuts the entrance guide, the sheet moves the tip of the entrance guide and forms the entrance guide angle to prevent the occurrence of the crease in the envelope. In the above-described configuration, the envelope entering the fixing device pushes down the tip of the entrance guide 7 and changes the entrance guide angle to prevent the occurrence of the crease in the envelope.

Next, embodiments of the pressing force adjuster are described with reference to FIGS. 15 to 17.

Figure 15:
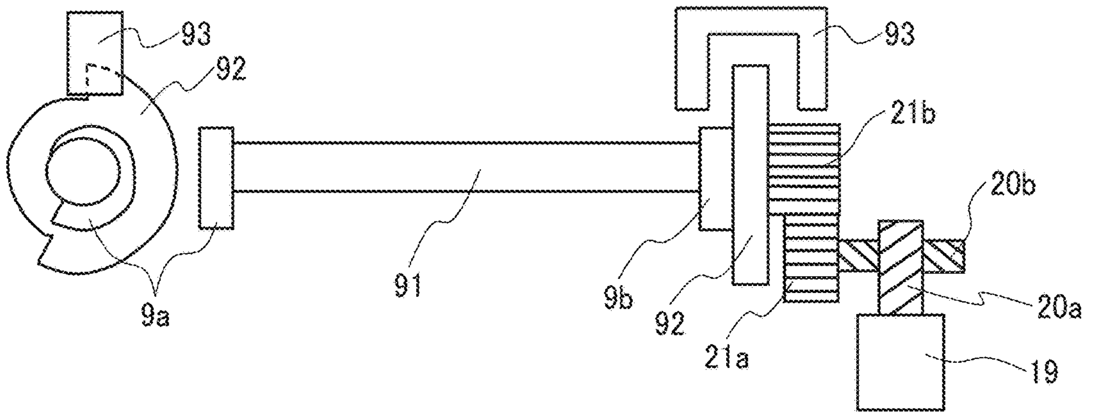
FIG. 15 is a diagram illustrating an example of a configuration of a pressing force adjuster driven by a motor.

FIG. 15 is a diagram illustrating an example of the pressing force adjuster driven by a motor. The pressing force adjuster of FIG. 15 includes a cam shaft 91, a pair of cams 9*a* and 9*b* disposed at both ends of the cam shaft 91 in the axial direction of the cam shaft 91, a motor 19, and a driving system configured by worm gears 20*a* and 20*b* and spur gears 21*a* and 21*b*. The motor 19 drives and rotates the pair of cams 9*a* and 9*b* via the driving system. The pressing force adjuster also includes an optical sensor 93 and a rotational position detector 92. The rotational position detector 92 is coaxially disposed with the pair of cams 9*a* and 9*b* and has a step portion as illustrated in FIG. 15. The optical sensor 93 can detect the step portion, which enables controlling a position of the pair of cams 9*a* and 9*b* in a rotation direction of the pair of cams 9*a* and 9*b* to be a desired position.

Figure 16:
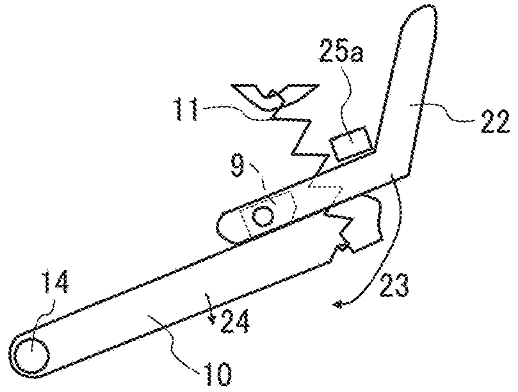
FIG. 16 is a diagram illustrating an example of a configuration of the pressing force adjuster including a manual operation lever rotated to increase the pressing force.
Figure 17:
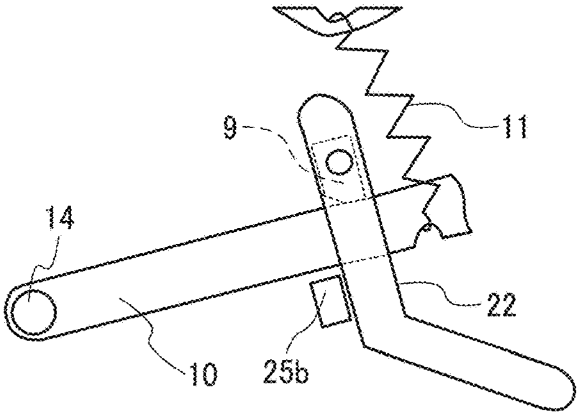
FIG. 17 is a diagram illustrating the example of the configuration of the pressing force adjuster including the manual operation lever rotated to decrease the pressing force.

As illustrated in FIG. 16, the pressing force adjuster may include the manual operation lever. The user rotates the manual operation lever by a predetermined angle to reduce the pressing force when the image forming apparatus prints the toner image on the envelope. FIG. 16 is a diagram illustrating an example of a configuration including the manual operation lever rotated to increase the pressing force. FIG. 17 is a diagram illustrating the example of the configuration including the manual operation lever rotated to decrease the pressing force. FIG. 16 illustrates a condition to increase the pressing force, and FIG. 17 illustrates a condition to decrease the pressing force.

A manual operation lever 22 is coaxially coupled to the cam 9 and is manually rotatable about the rotation center of the cam 9. Rotating the manual operation lever 22 about the shaft of the cam 9 in the direction indicated by an arrow 23 in FIG. 16 rotates the pressure arm 10 in the direction indicated by an arrow 24 and sets the cam 9 at the position to reduce the pressing force as illustrated in FIG. 17. The pressing force adjuster may include stoppers 25*a* and 25*b*. The stoppers 25*a* and 25*b* stop the manual operation lever 22 at the position to increase the pressing force and the position to reduce the pressing force, respectively.

In each of the above-described embodiments, the cam 9 may be manually driven or driven by an electric driver. Using the cam can simplify the configuration.

Next, a description is given of a basic configuration of the image forming apparatus.

Figure 18:
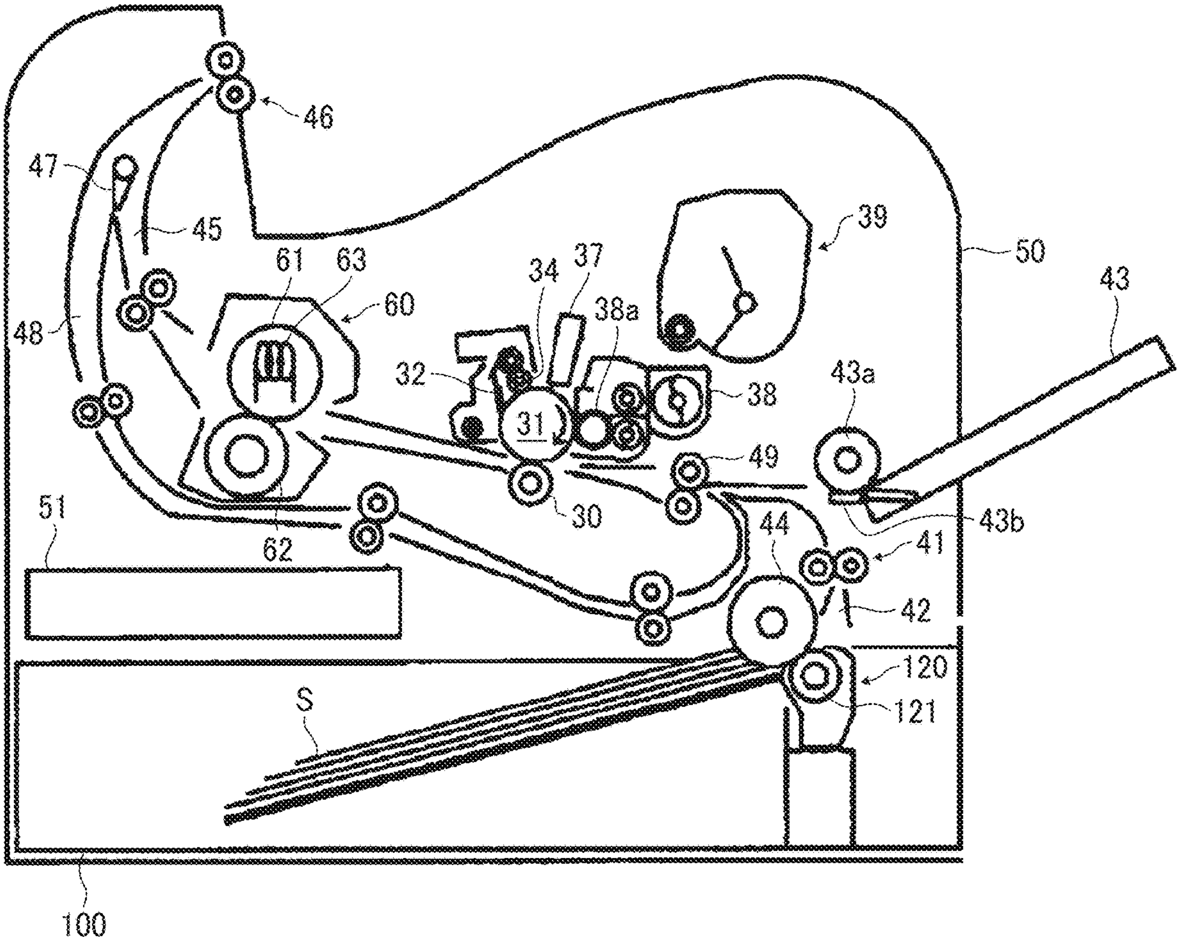
FIG. 18 is a schematic cross-sectional view of an image forming apparatus according to an embodiment of the present disclosure.

FIG. 18 is a schematic cross-sectional view of the image forming apparatus according to the present embodiment of the present disclosure. In FIG. 18, the image forming apparatus includes a housing 50, a photoconductor 31, and a sheet tray 100. The photoconductor 31 functions as an image bearer or a latent image bearer. The sheet tray 100 is detachably attachable to the housing 50. The sheet tray 100 contains a bundle of sheets S as recording media.

The image forming apparatus further includes a feed roller 44. As the feed roller 44 rotates, the sheet S is sent out from the sheet tray 100. After passing through a sheet separation nip described below, the sheet P enters a sheet feeding path 42. In the sheet feeding path 42, a first conveyance roller pair 41 nips the sheet P therein and conveys the sheet P in the sheet conveyance direction. A registration roller pair 49 is disposed at an end of the sheet feeding path 42. When the sheet S reaches the registration roller pair 49, the sheet S is temporarily stopped in a state in which the leading end of the sheet S is in contact with a registration nip of the registration roller pair 49. Abutting the leading end of the sheet S on the registration nip corrects skew of the sheet S.

The registration roller pair 49 starts rotating to feed the sheet S to a transfer nip timely so that the toner image on the photoconductor 31 is transferred onto the sheet S in the transfer nip. At this time, the first conveyance roller pair 41 starts rotating at the same time as the start of rotation of the registration roller pair 49 to resume the conveyance of the sheet S that is temporarily stopped.

The housing 50 of the image forming apparatus holds a bypass sheet feeder including a bypass feeder 43, a bypass feed roller 43*a*, and a separation pad 43*b*. As the bypass feed roller 43*a* rotates, the sheet manually set on the bypass feeder 43 is fed from the bypass feeder 43. The separation pad 43*b* is disposed in contact with the bypass feed roller 43*a*, forming a separation nip. After passing through the separation nip between the bypass feed roller 43*a* and the separation pad 43*b*, the sheet enters a region upstream from the registration roller pair 49 in the sheet feeding path 42 in the sheet conveyance direction. The sheet passes the registration roller pair 49 and reaches the transfer nip similar to the sheet fed form the sheet tray 100.

The photoconductor 31 is a drum-shaped photoconductor that rotates in a clockwise direction in FIG. 18. Around the photoconductor 31, the image forming apparatus includes a charging roller 34, a latent image writing device 37, a developing device 38, the transfer roller 30, and a cleaning blade 32. The charging roller 34 rotates while contacting the photoconductor 31, thereby forming a charging nip. A power supply applies a charging bias to the charging roller 34. Thus, in the charging nip, an electrical discharge is induced between the surface of the photoconductor 31 and the surface of the charging roller 34. As a result, the surface of the photoconductor 31 is uniformly charged.

The latent image writing device 37 includes a light emitting diode (LED) array and performs light scanning with LED light over the surface of the photoconductor 31 that has been uniformly charged. On the uniformly charged surface of the photoconductor 31, the area having been subjected to the light irradiation through this light scanning attenuates the electric potential therein. Thus, an electrostatic latent image is formed on the surface of the photoconductor 31.

As the photoconductor 31 rotates, the electrostatic latent image passes through a developing range between the surface of the photoconductor 31 and the developing device 38. In the developing range, the developing device 38 supplies toner to the electrostatic latent image formed on the photoconductor 31, visualizing the electrostatic latent image as the toner image.

A toner cartridge 39 is disposed above the developing device 38. The toner cartridge 39 contains fresh toner to be supplied. The fresh toner is supplied to the developing device 38 according to a toner supply operation signal output from a controller 51.

As the photoconductor 31 rotates, the toner image formed on the surface of the photoconductor 31 as a result of the development by the developing device 38 enters the transfer nip where the photoconductor 31 and the transfer roller 30 as a transferor contact each other. An electric bias having the opposite polarity to the latent image electric potential of the photoconductor 31 is applied to the transfer roller 30 to form a transfer electric field in the transfer nip.

As described above, the registration roller pair 49 conveys the sheet S toward the transfer nip in synchrony with a timing at which the toner image formed on the photoconductor 31 is overlaid onto the sheet S in the transfer nip. Due to the transfer electric field and a transfer nip pressure, as the sheet S is brought to closely contact with the toner image formed on the photoconductor 31 at the transfer nip, the toner image is transferred onto the sheet S.

Residual toner that is not transferred onto the sheet S remains on the surface of the photoconductor 31 after having passed through the transfer nip. The cleaning blade 32 is in contact with the photoconductor 31 to scrape off the residual toner from the surface of the photoconductor 31 and clean the surface of the photoconductor 31.

The surface of the photoconductor 31 that is cleaned by the cleaning blade 32 is electrically discharged by an electric discharging device. Thereafter, the surface of the photoconductor 31 is uniformly charged again by the charging roller 34.

After the sheet S passes through the transfer nip formed by the photoconductor 31 and the transfer roller 30 contacting each other, the sheet S is conveyed to a fixing device 60. The fixing device 60 includes a fixing roller 61, a heat source 63 such as a halogen lamp, and a pressure roller 62. The fixing roller 61 serves as a heating rotator. The heat source 63 is inside the fixing roller 61. The pressure roller 62 serves as a nip formation rotator and is pressed against the fixing roller 61. The fixing roller 61 and the pressure roller 62 contact each other to form the fixing nip.

The fixing roller 61 includes a hollow core made of metal such as stainless steel or aluminum and a release acceleration layer covering an outer peripheral surface of the core to improve releasability of toner and paper powder from the surface of the fixing roller 61. The pressure roller 62 includes a core made of metal such as stainless steel or aluminum and an elastic layer on an outer surface of the core. The elastic layer is made of material having elasticity and heat resistance such as fluoro-rubber or silicone rubber.

The toner image is fixed to the surface of the sheet S that is held in the fixing nip due to application of heat and pressure. Thereafter, the sheet S that has passed through the fixing device 60 passes through a sheet ejection path 45. Then, the sheet S is held in a sheet ejection nip formed by a pair of sheet ejection rollers 46.

The image forming apparatus switches printing modes between a single-side printing mode for performing single-side printing and a duplex printing mode for performing duplex printing. In the single-side printing mode, the image forming apparatus forms the image on one side of the sheet S. By contrast, the image forming apparatus prints respective images on both sides of the sheet S in the duplex printing mode. In the single-side printing mode or in the duplex printing mode after images are formed on both sides of the sheet S, the pair of sheet ejection rollers 46 continues rotating in a forward direction. As a result, the sheet S in the sheet ejection path 45 is ejected out of the image forming apparatus. The ejected sheet S is stacked on a sheet stacker provided on the top face of the housing 50 of the image forming apparatus.

By contrast, in the duplex printing mode, after the image is formed on one side of the sheet S, the pair of sheet ejection rollers 46 is rotated in the reverse direction at the timing at which the end of the sheet S enters the sheet ejection nip of the pair of sheet ejection rollers 46. At this time, a switching claw 47 disposed near the downstream end of the sheet ejection path 45 moves to block (close) the sheet ejection path 45 and open an entrance of a reverse conveyance path 48 at the same time. As the sheet S starts reversing by the reverse rotation of the pair of sheet ejection rollers 46, the sheet S is conveyed to the reverse conveyance path 48. In the reverse conveyance path 48, the sheet S is conveyed while being vertically reversed and then conveyed to the registration nip of the registration roller pair 49 again. Then, after the toner image has been transferred to the other side of the sheet S in the transfer nip, the sheet S passes through the fixing device 60, the sheet ejection path 45, and the pair of sheet ejection rollers 46 and is then ejected to the outside of the housing 50 of the image forming apparatus.

When the fixing device 60 fixes the toner image onto the sheet S, the sheet S is subjected to high temperature. Under the high temperature, moisture in the sheet evaporates. Evaporation of the moisture can cause a so-called end curl in which an end of sheet in a width direction of the sheet curls depending on the grain of sheet. In particular, the end curl is likely to occur in the case that the sheet is a large sheet of plain paper.

Note that the present disclosure is not limited to the above-described embodiments. Within the scope of the present disclosure, those skilled in the art may change, add, or convert each element of the above-described embodiments.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A fixing device comprising:

a fixing rotator;

a pressure rotator configured to press the fixing rotator to form a nip between the fixing rotator and the pressure rotator;

a pressure plate configured to rotate about a fulcrum to press the pressure rotator;

a pressing force adjuster configured to adjust a pressing force of the pressure rotator;

an entrance guide configured to guide a recording medium entering the nip;

an exit guide configured to guide the recording medium ejected from the nip; and a guide configured to guide the pressure rotator in a direction inclined from a line connecting a rotation center of the fixing rotator and a rotation center of the pressure rotator toward downstream in a conveyance direction of the recording medium, wherein the pressing force adjuster is configured to rotate the pressure plate about the fulcrum to adjust the pressing force and set the pressure plate to any of a plurality of positions in a rotation direction of the pressure plate, wherein the plurality of positions includes a maximum pressure position at which the pressure rotator pressed by the pressure plate presses a sheet of plain paper with a maximum pressing force and an envelope position at which the pressure rotator pressed by the pressure plate presses an envelope with a pressing force smaller than the maximum pressing force, wherein the pressure rotator at the maximum pressure position sets an exit guide angle between a reference line connecting an entrance of the nip and an exit of the nip and a straight line connecting a center of the nip and a tip of the exit guide to be in a range from 0° to +15°, and wherein the pressure rotator at the envelope position sets the exit guide angle to be in range from −10° to +5°, and where a positive angle is formed by the reference line and the straight line inclined toward one of the fixing rotator and the pressure rotator, the one having a convex shape in the nip, and a negative angle is formed by reference line and the straight line inclined toward the other of the fixing rotator and the pressure rotator, the other having a concave shape in the nip.

2. The fixing device according to claim 1, wherein the pressing force adjuster includes a cam being in contact with the pressure plate and configured to be driven by one of a motor and a manual operation lever to set the pressure plate at one of a maximum pressure position at which the pressure rotator pressed by the pressure plate presses a sheet of plain paper with a maximum pressing force and an envelope position at which the pressure rotator pressed by the pressure plate presses an envelope with a pressing force smaller than the maximum pressing force.

3. The fixing device according to claim 1, further comprising a side plate holding the fixing rotator and the pressure rotator.

4. The fixing device according to claim 3, wherein the side plate holding the fixing rotator and the pressure rotator includes the guide.

5. The fixing device according to claim 3, wherein the side plate holding the fixing rotator and the pressure rotator includes a railing configured to position the pressure rotator.

6. The fixing device according to claim 1, further comprising two side plates configured to position the pressure rotator in a direction inclined from a line connecting a rotation center of the fixing rotator and a rotation center of the pressure rotator toward downstream in the conveyance direction of the recording medium.

7. The fixing device according to claim 1, wherein the entrance guide has an opening.

8. The fixing device according to claim 1, wherein the entrance guide is configured to be movable.

9. An image forming apparatus comprising the fixing device according to claim 1.

* * * * *